Aug. 6, 1968  A. SALVI  3,396,329
MAGNETIC RESONANCE MAGNETOMETERS FOR MEASURING WEAK
MAGNETIC FIELDS FROM ABOARD A MOVING
VEHICLE, AS A PLANE
Filed April 20, 1966  2 Sheets-Sheet 1

INVENTOR
ANTOINE SALVI
BY William W Stoke
ATTORNEY

United States Patent Office 3,396,329
Patented Aug. 6, 1968

3,396,329
MAGNETIC RESONANCE MAGNETOMETERS FOR MEASURING WEAK MAGNETIC FIELDS FROM ABOARD A MOVING VEHICLE, AS A PLANE
Antoine Salvi, Fontaine, France, assignor to Commissariat à l'Energie Atomique, Paris, France, an organization of France
Filed Apr. 20, 1966, Ser. No. 543,967
Claims priority, application France, Apr. 22, 1965, 14,224
3 Claims. (Cl. 324—.5)

ABSTRACT OF THE DISCLOSURE

A magnetometer comprising: a vessel with two adjacent compartments, each containing a system of subnuclear particles, the particles in the different containers having different gyromagnetic ratios and therefore different resonance frequencies in the magnetic field in which they are located; a pair of pick-up coils oriented in parallel, each surrounding one of said compartments for picking up electromotive forces at the different resonant frequencies, said coils being coupled together for mixing said frequencies; a pair of excitation coils oriented perpendicularly to said pick-up coils for being decoupled therefrom, each of said pick-up coils delivering in one excitation coil through a linear high-gain amplifier; and a detector, connected to the output of one amplifier, feeding through a filter, a frequency meter in which is measured a frequency proportional to the intensity of the magnetic field, independent of the rotation of the vessel.

---

Figure 1:
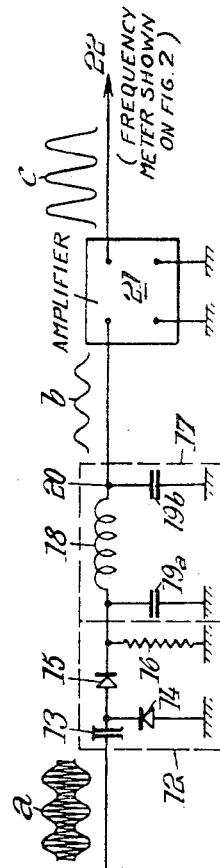
Figure 1:
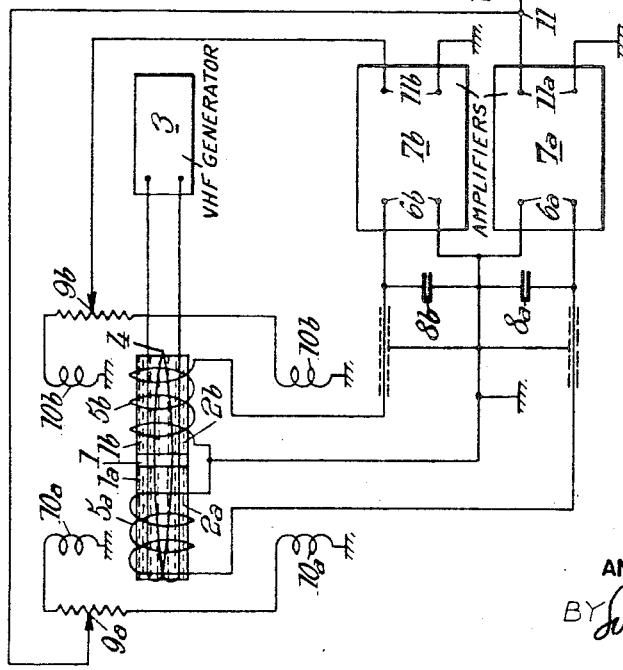

The present invention relates to magnetic resonance magnetometers.

This application is copending with U.S. application Ser. No. 417,061 filed Dec. 9, 1964, by Anatole Abragam and Ionel Solomon and assigned to the same assignee, and describes an improvement of the magnetometer system disclosed therein.

At the present time there are different types of known magnetometers based on magnetic resonance. Such devices are based upon the measurement of the precession frequency, called Larmor frequency, of the magnetic moment, generally the nuclear magnetic moment, of a subatomic particle, generally an atomic nucleus and more particularly a proton, in the magnetic field to be measured, this frequency being proportional to the intensity of the magnetic field in which said subatomic particle is placed.

Designating by H the intensity in gauss of the magnetic field to be measured, in which the subatomic particle is placed, by $\gamma$ the gyromagnetic ratio of the particle (the existence of a well determined $\gamma$ ratio meaning that the angular momentum or spin and therefore also the magnetic moment of the particle are different from zero) and by $F_0$ the precession or Larmor frequency in cycles per second, there is the relation:

$$2\pi F_0 = \gamma H \qquad (1)$$

The gyromagnetic ratio $\gamma$, expressed in gauss/sec., is known with a very great precision for many atomic nuclei. In particular the gyromagnetic ratio of the proton in deoxygenated water is known with a precision of one part in one million and it is equal to 26751.3 gauss/sec.

The electromagnetic radiation of a frequency equal to F is circularly polarized, the resonance producing a rotation of the total magnetic moment about the direction of the magnetic field. The electromagnetic radiation rotary field is detected by means of at least one pick-up coil, disposed around the subatomic particles, in which coil the rotary field produces an alternating voltage. It follows that, if the coil is located on board of a movable body having an instantaneous angular velocity $\omega$ of rotation about the direction of the magnetic field, the coil is itself driven at this angular velocity and the frequency of the alternating voltage, which is created in said coil by magnetic resonance, will no longer be given by the above Formula 1, which corresponds to the absolute rotation of the total magnetic moment with respect to a stationary reference system, but will correspond to the relative rotation of this moment with respect to a reference system linked to the movable body and therefore to the coil. In other words, according to the law of composition of angular velocities, and calling $f$ the frequency in the case of a rotation at the instantaneous velocity $\omega$, the above formula will become $$2\pi f = \gamma H - \omega \qquad (2)$$

If it is desired, in particular, to measure with a high precision a weak magnetic field such as the earth magnetic field, and its variations, with a magnetic resonance magnetometer of the prior type, the measurement is inaccurate, because it is based on Formula 1 and neglects the influence of $\omega$. Now $\omega$ can take values which are relatively important and are very variable when the measurement is made on board of an aircraft, or other movable body capable of rotating about the axis of the magnetic field. It is very difficult, if not impossible, to make the correction corresponding to $\omega$, due to the fact that the value of $\omega$ is very variable, so that very troublesome inaccuracies in the measurement of H and chiefly of the variations thereof occur.

Field work relating to magnetism and geophysical researches concerning mineral substances based upon the variations of H is therefore inaccurate if the influence of $\omega$ is neglected.

The above mentioned prior application described a magnetometer obviating the above mentioned drawbacks, this magnetometer comprising subatomic particles having a non-zero magnetic moment and a non-zero angular momentum, means capable of exciting and detecting the magnetic resonance thereof, and means for measuring the frequency of the signal thus detected, said magnetometer being essentially characterized in that, on the one hand, the particles the resonance of which is detected are of two kinds having different values for the ratio of said moment and said momentum called gyromagnetic ratio, and, on the other hand, the magnetometer includes means for measuring the algebraic difference of the two corresponding magnetic resonance frequencies, each of these frequencies having the sign of the gyromagnetic ratio of the corresponding subatomic particles, respectively.

As a matter of fact, if one calls $f'$ and $f''$, on the one hand, and $\gamma'$ and $\gamma''$, on the other hand, the values of $f$ and of $\gamma$ for the two kinds of particles, which are for instance constituted by protons for which $\gamma'$ is positive and fluorine nuclei for which $\gamma''$ is also positive but lower than $\gamma'$, relation 2 is as follows for the two nuclei:

$$2\pi f' = \gamma' H - \omega \qquad (3)$$

$$2\pi f'' = \gamma'' H - \omega \qquad (4)$$

If $f'''$ is the difference between $f'$ and $f''$, then:

$$2\pi f''' = 2\pi f' - 2\pi f'' = (\gamma' - \gamma'')H = GH \qquad (5)$$

G being the difference $\gamma' - \gamma''$ and it being supposed that $\gamma'$ is greater than $\gamma''$. The values of $\gamma'$ and $\gamma''$ being known with a great precision, G is also known with a high precision.

Relation 5 therefore replaces relation 1, with the advantage that the frequency $f'''$ is strictly proportional to H even if the magnetometer is rotating with respect to the direction of H with velocity $\omega$.

In the case where $\gamma'$ and $\gamma''$ are not of the same sign, $\gamma'$ being for instance positive and $\gamma''$ negative, relation 3 remains true, whereas relations 4 and 5 are replaced by the following relations:

$$2\pi f'' = \gamma - \gamma''.H \quad (4a)$$
$$2\pi(f'+f'') = (\gamma'-\gamma'')H = GH \quad (5a)$$

G being in all cases the algebraic difference of the two gyromagnetic ratios.

As pairs of subatomic particles suitable for the present invention, the following may be cited:

protons and fluorine nuclei,
protons and phosphorus nuclei,
protons and helium 3 nuclei.

All these nuclei have positive gyromagnetic ratios, with the exception of helium, which has a negative gyromagnetic ratio.

It has also been indicated in the prior application that, in the preferred embodiments (this is in particular true for the two first mentioned pairs of subatomic particles), use is made of the method of dynamic polarization by electronic pumping disclosed in the French Patent No. 1,174,136 filed Apr. 6, 1957, to which corresponds U.S. Patent No. 3,049,661, issued Aug. 14, 1962, that is to say of liquid samples containing in solution in a solvent containing said nuclei (protons, fluorine nuclei, phosphorous nuclei), a paramagnetic radical comprising an unpaired electron, saturation of an electronic resonance line increasing the intensity of the nuclear signal.

As for each of the magnetic resonance generators or heads of the magnetometer, it is advantageously made in the prior application in the form of a spin oscillator described in the French Patent No. 1,351,587 filed Dec. 28, 1952, to which corresponds U.S. patent application Ser. No. 333,901, filed Dec. 27, 1963, now U.S. Patent No. 3,249,856, issued May 3, 1966.

The present invention has for its object a magnetometer having a single measurement head wherein the two frequencies $f'$ and $f''$ are mixed together by mutual coupling between the pick up coils.

The object of the present invention is a magnetometer comprising in combination a vessel made of two compartments containing each a system of subatomic particles, with different gyromagnetic ratios for the two compartments, two pick-up coils each wound about one compartment, respectively, these two coils having a mutual coupling and being connected each to the input terminals of a substantially linear amplifier having a very high gain the output terminals of each amplifier being connected to an excitation coil disposed with its axis perpendicular to the axis of the pick-up coil connected to the input terminals of the same amplifier, a detector connected to the output of one of the amplifiers, a filter connected to to the output of said detector, and means for measuring the frequency of the output voltage of said filter, possibly amplified, which frequency is strictly proportional to the intensity of the magnetic field in the zone where is located the vessel and independent of the rotations of said vessel.

In the preferred embodiment, each compartment contains a solution comprising, on the one hand, a solvent including said subatomic particles and, on the other hand, dissolved in this solvent, a paramagnetic free radical having a relatively high resonance frequency in a zero magnetic field and a dipolar coupling between the spins of the free radical unpaired electrons and the spins of the solvent atomic nuclei, saturation of an electronic resonance line of such a radical increasing, by the Overhauser-Abragam effect, the intensity of the signal, at the Larmor frequency, of the atomic nuclei, and the magnetometer comprises means for saturating said resonance line in both said compartments.

The invention is also concerned with improvements in frequency meters to enable them to make accurate measurements at the low frequency, for instance of the order of 100 hertz, supplied by the magnetometer according to this invention. For this purpose, the frequency meter of the magnetometer comprises, in combination: means for shaping the low frequency signal, means for deducing from this shaped signal unidirectional pulses of the same frequency as said shaped signal, means capable of delivering calibrated pulses of a frequency much greater than the frequency of the low frequency signal, switching means capable, when unblocked, of passing said calibrated signals, a frequency divider receiving the output of said switching means, a trigger with two inputs, one of which receives said unidirectional pulses resulting from the pulse signal and the other of which receives control pulses deduced from the output of said divider, said trigger having an output which is fed from the time the first input is fed with a unidirectional pulse to the time the second input is fed with a control pulse, said output unblocking said switching means while it is fed with current, and means for integrating the output of the divider.

The magnetometer according to the present invention is particularly suitable for measuring the variations, on board of an aircraft, of the earth magnetic field.

Figure 2:
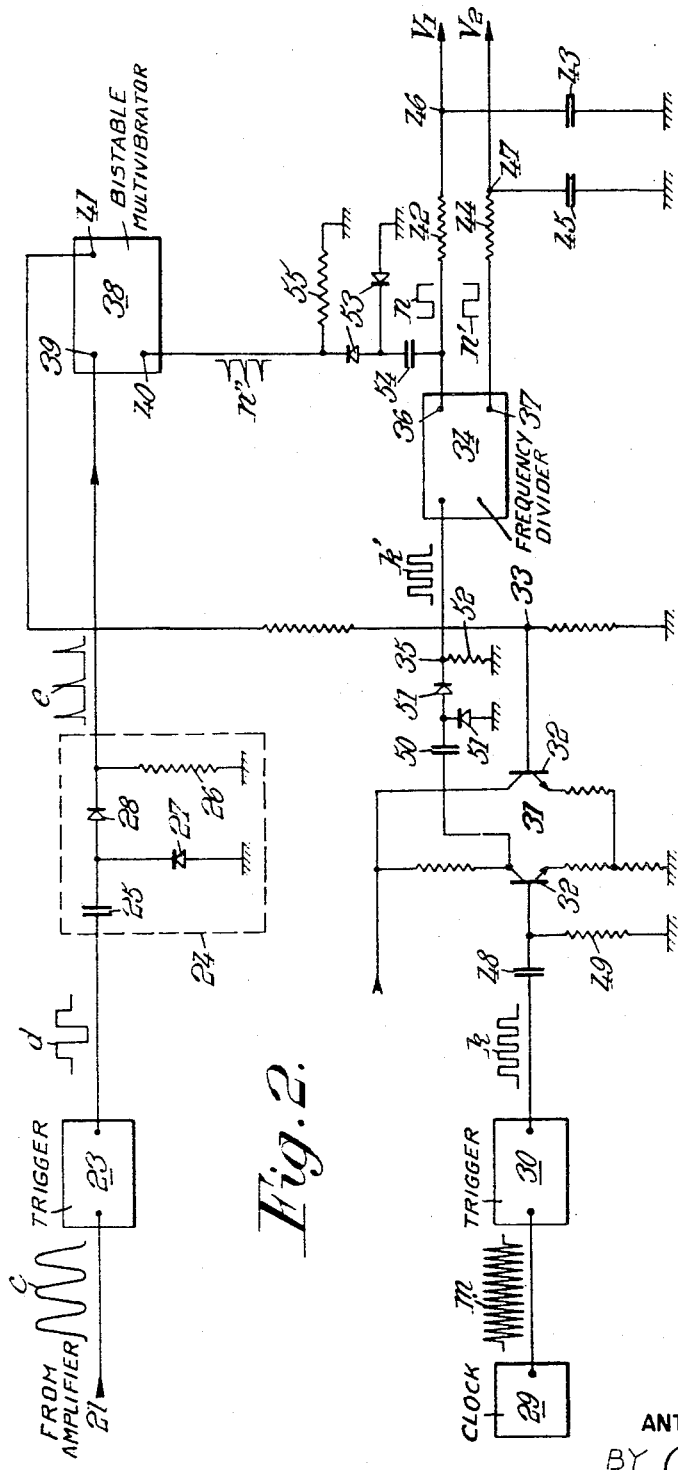

Preferred embodiments of the present invention will be hereinafter described with reference to the appended drawings, given merely by way of example, and in which:

FIG. 1 diagrammatically shows a magnetometer head according to the present invention;

FIG. 2 shows an embodiment of a low frequency frequency meter adapted to measure the frequency supplied by the magnetometer head of FIG. 1.

The magnetometer of FIG. 1 comprises a vessel 1 having two compartments 1a, 1b, each containing a solution 2a, 2b, respectively, each including, on the one hand, a solvent containing atomic nuclei having a non zero magnetic moment and a non zero angular momentum, and consequently a well determined gyromagnetic ratio, and, on the other hand, dissolved in this solvent, a paramagnetic free radical having a relatively high resonance frequency in a zero magnetic field and a dipolar coupling between the spins of the unpaired electrons of the free radical and the spins of the atomic nuclei of the solvent, saturation of an electronic resonance line of such a radical increasing, by the Overhauser-Abragam effect, the intensity of the signal, at the Larmor frequency, of the atomic nuclei, said nuclei preferably having a very low quadrupolar moment.

By way of example, compartment 1a contains a M/750 solution of ditertiobutylnitroxide in a solvent consisting of one half of water and one half of acetone, whereas compartment 1b contains the same ditertiobutylnitroxide free radical in the same proportion in a solvent consisting of carbon hexafluoride $C_6F_6$.

The electronic resonance line at 68.8 mHz. or of mc./s. ditertiobutylnitroxide in compartments 1a and 1b is saturated by means of a VHF generator 3 operating on 68.8 mHz. and of a coil 4 (or, to be more accurate, two coils in series) fed from generator 3 and creating in vessel 1 a magnetic field at said 68.8 mHz. frequency.

About each compartment 1a, 1b there is wound a pick-up coil 5a, 5b, respectively, coils 5a, 5b being identical and wound about the same axis in such manner as to induce opposed fluxes in each other.

Each of said coils 5a, 5b is connected with the input terminals 6a, 6b of an amplifier 7a, 7b, without phase distortion. Preferably, said amplifiers are relatively selective and have each a narrow band centered on $f'$ and $f''$, respectively. In this case, the selectivity of the resonance circuit constituted by a coil 5a, 5b and the corresponding capacitor 8a, 8b, disposed in shunt with the coil across the input terminals 6a, 6b of the amplifier 7a, 7b, eliminates most of the background noise and consequently increases the signal to noise ratio at the output 11a, 11b of amplifier 7a, 7b. The latter, which may have a gain of the order of 70 decibels, has its output connected, through an adjustment potentiometer 9a, 9b with a double excitation coil 10a, 10b.

The axes of coils 5a, 5b are at right angles to those of coils 10a, 10b, respectively, in such manner as to ensure an electric decoupling between each pair coils 5a, 10a and the other pair 5b, 10b. The residual coupling is reduced by means of potentiometer 9a, 9b.

Due to the saturation of the electronic resonance line at 68.8 mHz. of ditertiobutylnitroxide, the magnetic resonance signals of the protons of aqueous solution 2a, on the one hand, and of the fluorine nuclei of the non aqueous solution 2b, on the other hand, in the magnetic field H existing in the zone occupied by vessel 1, has an increased intensity due to the Overhauser-Abragam effect.

The signal at the Larmor nuclear frequency $f'$, $f''$ in each compartment 1a, 1b is detected by means of the spin oscillator type arrangement including coils 5a, 10a, on the one hand, and 5b, 10b, on the other hand.

In the above mentioned decoupling conditions, only the nuclear resonance phenomenon is capable of coupling together coils 5a, 10a, on the one hand, and 5b, 10b, on the other hand. When pick-up coil 5a, 5b is the seat of the nuclear induction alternating electromotive force at the Larmor frequency corresponding to magnetic field H and to the gyromagnetic ratio $\gamma'$ or $\gamma''$, respectively, this electromotive force is amplified by amplifier 7a, 7b, then applied to excitation coil 10a, 10b, respectively, the magnetic field of which ensures the permanency of this electromotive force, which sustains the oscillations.

It may be said that each of the systems 5a–7a–10a, with compartment 1a, on the one hand, and 5b–7b–10b, with compartment 1b, on the other hand, constitutes what can be considered as a quantum oscillator corresponding to the conventional reaction oscillator wherein the nuclear resonance curve plays the part of the oscillatory circuit curve in a conventional oscillator. As coupling takes place at the Larmor frequency, the quantum oscillator oscillates at this frequency. Therefore, each amplifier 7a, 7b delivers, at the output 11a, 11b thereof, a voltage of a frequency equal to said Larmor frequency for the protons, on the one hand, and the fluorine nuclei, on the other hand, that is to say $f'$ for 7a and $f''$ for 7b.

According to the present invention, coils 5a and 5b being also coupled together by mutual induction, a beat is obtained between the two spin coupling oscillators and consequently at the output 11a, 11b, of an amplifier 7a, 7b for instance at point 11, the beat frequency is $$f' - f'' = \frac{\gamma' - \gamma''}{2} \cdot H$$

The beat signal $a$ is detected by a detector 12 comprising a capacitor 13, two semi-conducting diodes 14, 15 and a resistor 16, diode 15 permitting only the rectified current to pass. The rectified current is filtered in a filter 17 comprising a coil 18 and capacitors 19a, 19b. The rectified and filtered voltage $b$, at frequency $f' - f''$, available at 20 is amplified in amplifier 21, the output $c$ of this amplifier being connected to a frequency meter 22, for instance of the type illustrated by FIG. 2.

In an embodiment of this invention, coils 5a, 5b may have each 5000 turns of enamelled copper wire of 0.25 mm. tuned by means of capacitors 8a and 8b to the frequency of 1950 Hz. or c./s. for 5a and 1240 Hz. or c./s. for 5b in the earth field of an order of magnitude of 0.5 oersted, whereas coils 10a, 10b each have 200 turns of enamelled copper wire of 0.30 mm. A screen (not shown) transparent to nuclear frequencies of the order of 1950 and 1240 Hz., but opaque to the electronic frequency of 68.8 mHz. is disposed between coils 4 and 5a, 5b.

The coupling capacitor 13 has a capacity of 0.022 microfarad. Capacitors 19a and 19b have capacities of 0.5 microfarad and 0.1 microfarad, respectively. The leak resistor 15 has a value of 15 kilohms. Coil 18 has a self inductance of 11.2 henrys and diodes 14 and 15 are 17 $P_2$ diodes.

Finally, amplifier 21 is a band-pass amplifier the passing band of which ranges from 50 hertz to 150 hertz or c./s. which corresponds to a range of magnetic fields from 0.25 to 0.75 oersted, the output voltage $c$ applied to frequency meter 22 averaging 2 volts.

FIG. 1 shows signals $a$ at point 11, $b$ at point 20 (rectified and filtered signal) and $c$ at the output of amplifier 21.

Signal $c$ is of a frequency strictly proportional to the intensity of the magnetic field to be measured, according to Formula 5 ($f'''$ being the frequency of this signal). This frequency ranges from 50 to 150 hertz, the mean value of 100 hertz corresponding to the mean intensity of the earth magnetic field (0.5 oersted). Such a low frequency (the frequency of a proton magnetometer being about 2100 hertz in the earth magnetic field) somewhat limits the absolute accuracy of the magnetometer. However, what is important in the case of geophysical or other prospection by means of a magnetovariometer carried by an aircraft is less the measurement of the intensity of the earth magnetic field with a very high accuracy than the variations and abnormalities of the magnetic field with a high relative accuracy. Now, the invention permits of keeping a constant sensitiveness within the field of measurement, that is to say in the band of useful frequencies (from 50 to 150 hertz) without perturbations by the rotations of the measurement head.

The frequency meter illustrated by FIG. 2, which has its input connected with the output of amplifier 21, permits of making low frequency measurements within a wide band with a constant sensitivity. This frequency meter ensures the integration of constant areas. It comprises:

Means 23, consisting advantageously of a Schmitt trigger circuit, to shape the low frequency signal $c$ which is thus transformed into a succession of rectangular pulses $d$ of the same frequency $f'''$ (signal $d$), Means for deducing from this shaped signal $d$ unidirectional pulses $e$ of the same frequency $f'''$ as the shaped signal $d$, said means being advantageously constituted by a rectifying and differentiating system 24 including a capacitor 25 and a resistor 26, to perform the differentiation, and rectifying diodes 27, 28, Means for supplying calibrated pulses $k$ of a frequency F much greater than the frequency $f'''$ of the low frequency signal $c$, said means consisting for instance of a clock 29 delivering a sinusoidal reference signal $m$ of frequency F and a shaping Schmitt trigger circuit 30 transforming the sinusoidal signal $m$ into a succession of rectangular pulses $k$, Switch means 31 essentially including two transistors 32 forming a Schmitt trigger circuit which passes the calibrated signals $k$ in the form of a succession of pulses $k'$ as long as the input 33 of said switch means is fed with current, A frequency divider 34 connected to the output 35 of said switch device so as to receive therefrom the succession of pulses $k'$ giving a succession of pulses $n$ at its first output 36 and a train $n'$ at its second output 37, A bistable multivibrator or flip-flop circuit 38 with, on the one hand, two inputs 39, 40 one of which, 39, receives the unidirectional pulses $e$ whereas the other, 40, receives the differentiated output $n''$ from frequency divider 34, and, on the other hand, an output 41, which is fed after the first input 39 has received a pulse $e$ until input 40 is fed with a pulse $n''$ resulting the differentiation of signal $n$, in rectifying and differentiating unit 54, 53, 55 similar to unit 24, said output 41 permitting, when it is fed with current, the flow of current through switch means 31 by feeding input 33 thereof and Means for integrating the successions of pulses $n'$ and $n$ delivered by divider 34, said means consisting for instance of a resistor 42 and a capacitor 43 for output 36 and a resistor 44 and a capacitor 45 for output 37.

In an embodiment of the invention, frequency $f'''$ ranging from 50 to 150 hertz with a mean value of 100 hertz, frequency F is equal to 204.8 kHz. or kc./s., divider 34 being a divider by 1024. In these conditions, divider 34 counts 1024 calibrated pulses $k'$, at a frequency equal to 204.8 kHz., starting from a first pulse $e$. After this counting of 1024 pulses $k'$, divider 34 changes through its output 36 the condition of bistable multivibrator 38 which blocks in switch means 31, the transmission of pulses $k$ until the next pulse $e$. Consequently, for every period of the succession of pulses $e$, and therefore of signal $c$, there is obtained a signal area $n$ the length of which is strictly constant (it corresponds to 1024 clock periods). Integration of this constant area gives a direct voltage $V_1$, available at 46, which is proportional to the frequency $f'''$ to be measured.

In order to increase sensitivity and to reduce the noises that might be produced by a variation of the feed voltage (variation of the amplitude of signal $n$) the measurement is performed by difference between the two voltages $V_1$ and $V_2$ (the latter being available at 47 and corresponding to the second output 37 of divider 34). This differential measurement sets the zero at the frequency of 100 Hz. in view of the fact that the division by 1024, in divider 34, of frequency $F=204.8$ kHz. gives a frequency of 200 hertz exactly twice the mean frequency $f'''=100$ hertz. For such a mean frequency of 100 hertz, the two signals $n$ and $n'$ are constituted by steps of the same length but of course of opposed polarities. To perform such a setting of the zero, it is necessary to have a fixed base frequency of 204.8 kHz. and for this purpose there is provided a clock 29 with a thermostated quartz.

With this frequency meter, a pulse $n$ or $n'$ of constant length is obtained and only a displacement of its position with respect to time can take place according to the phase ratio of signal $c$ and of the clock oscillations $m$. This displacement corresponds to a sinusoidal voltage of an amplitude equal to the value represented by the width of a reference period of signal $m$. It is therefore sufficient that ratio $F/f'''$ be great with respect to the frequency of the variations of a magnetic field to be measured.

In the preferred embodiment, the various resistors, capacitors and diodes are as follows:

Capacitor 25 _____ picofarads__ 470
Resistor 26 _____ kilohms__ 22
Diodes 27 and 28 _____ Type__ 17P$_2$
Capacitor 48 _____ picofarads__ 47
Resistor 49 _____ kilohms__ 100

(System 48, 49 constituting a differentiator (similar to differentiator 25, 26) transforming the rectangular pulses $k$ into pulses of the same shape as pulses $e$ but of frequency F, for attacking switch 31.)

Capacitor 50 _____ picofarads__ 47
Diodes 51 _____ Type__ 17P$_2$
Resistor 52 _____ kilohms__ 22
Resistor 56 _____ do__ 56
Resistors 42 and 44 _____ do__ 100
Capacitors 43 and 45 _____ microfarads__ 8
Diodes 53 _____ Type__ 17P$_2$
Capacitor 54 _____ picofarads__ 470
Resistor 55 _____ kilohms__ 22

(System 53, 54, 55 constituting also a differentiating and rectifying circuit transforming rectangular pulses $n$ in pulses $n''$.)

As for differentiating and rectifying circuit 50, 52, 51 (similar to circuit 24) it has for its effect to prevent the switching of transistor 32 to its "on" condition, thereby to start counting before the reference pulse arrives. As a matter of fact this transistor, once in its "on" condition, requires a state of equilibrium by drop of potential of its collector through the collector resistance. In the absence of differentiator 50–52 the voltage step resulting from this potential drop might start divider 34. The differentiator actually prevents the passage of this step.

The sensitivity that is obtained is 14 volts for 50 hertz or c./s., that is to say 0.6 m./v. per gamma (1 gamma corresponds to $1.10^{-5}$ oersted) and it is constant between 50 hertz and 150 hertz, that is to say when the magnetic field intensity varies from 0.25 to 0.75 oersted.

As above indicated, subtraction between voltages $V_1$ and $V_2$ is performed and the differential voltage $V_1-V_2$ is applied to a recorder (not shown), after filtering of the desired band through the intermediate of an amplifier (also not shown), the type of amplifier depending upon the recorder that is chosen. Advantageously the amplifier is made to comprise an attenuator which permits of adjusting its sensitivity, for instance to 1, 2.5, 5, 10, 25 of 50 gammas, according to the range to be recorded.

The magnetic resonance magnetometer according to the present invention has, over the existing magnetometers, many advantages and in particular the following ones:

First its measurements are independent of rotations of the magnetometer with respect to the direction of the magnetic field to be measured.

Its sensitivity is constant within the whole band of magnetic field intensities for which it is adjusted, It permits automatic recording of the variations of the earth magnetic field, Its sensitivity is adjustable according to several subranges.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A device for measuring the intensity of the magnetic field, in particular, the very low earth magnetic field, from a moving vehicle which comprises:

a vessel having first and second compartments located substantially side by side, said first compartment containing a system of subatomic particles having a particular gyromagnetic ratio, said second compartment containing another system of subatomic particles having a different gyromagnetic ratio;

a pick-up coil wound around said first compartment for picking up the magnetic resonance signal of its system at a frequency proportional to the product of the gyromagnetic ratio of its system and the intensity of the magnetic field in which is located said vessel;

a pick-up coil wound around said first compartment for picking up the magnetic resonance signal of its system at a frequency proportional to the product of the gyromagnetic ratio of its system and the intensity of the magnetic field in which is located said vessel;

said pick-up coils having their axis in parallel and being inductively coupled together in a manner so that in addition to delivering a voltage at the frequency generated therein by its individual magnetic resonance signal, there is also delivered an operative voltage at a frequency equal to the difference of the frequencies of said magnetic resonance signals;

at least one excitation coil located in the proximity of each of said compartments with the axis thereof perpendicular to the axis of the pick-up coil and wound around the respective compartment, for exciting its respective system and being electrically decoupled from the pick-up coil wound around its respective compartment in the absence of magnetic resonance;

a pair of substantially linear high gain amplifiers, each having a pair of input terminals connected across a different one of said pick-up coils, and a pair of output terminals connected across a different one of said excitation coils in such manner that the input and output terminals of each amplifier are connected across the respective pick-up and excitation coils related to the same compartment;

a detector having a pair of input terminals connected to the pair of output terminals of one of said amplifiers for receiving therefrom at least said operative voltage;

a filter having an input connected to the output of said detector for filtering the frequency of said operative voltage; and frequency measuring means connected to the output of said filter for measuring said frequency which is proportional to said intensity of the magnetic field and independent of the rotation of said container; and therefore of said vehicle in said field.

2. A magnetometer according to claim 1, wherein said wherein said frequency measuring means comprises, means for shaping the low frequency signal fed to said measuring means, means connected with the output of said signal shaping means for delivering at its output, in response to the shaped signals from said last mentioned means, unidirectional signal pulses of the same frequency as said signal, means for delivering calibrated pulses of a frequency much greater than that of said low frequency signal, switch means connected with the output of said calibrated pulse delivering means, for transmitting said pulses only when its control input is energized, a frequency divider connected to the output of said switch means for dividing the frequency of the pulses transmitted by said switch means, means connected with the output of said frequency divider for delivering at its output, in response to the pulses received therefrom, unidirectional calibrated pulses of the same frequency as the output of said frequency divider, a bistable multivibrator having two inputs and one output, one of said last mentioned inputs being connected with the output of said unidirectional signal pulse delivering means, the other of said inputs being connected with the output of said unidirectional calibrated pulse delivering means, said bistable multivibrator output being adapted to energize said control input of said switch means and thereby permit said switch means to pass said calibrated pulses to said frequency divider from the time its first input is fed with a unidirectional signal pulse to the time its second input is fed with a unidirectional calibrated pulse, and integrating means connected to the output of said frequency divider for time integrating the amplitude of the pulses delivered thereby.

3. A magnetometer according to claim 1 wherein, each of said compartments contains a solution comprising, on the one hand, a solvent including said subatomic particles and, on the other hand, dissolved in said solvent, a paramagnetic free radical having a relatively high resonance frequency in a zero magnetic field and a dipolar coupling between the spins of the free radical unpaired electrons and the spins of the solvent atomic nuclei, saturation of an electronic resonance line of such a radical increasing, by the Overhauser-Abragam effect, the intensity of the signal, at the Lamor frequency, of the atomic nuclei, said magnetometer further comprising means for saturating said resonance line in both said compartments.

References Cited
UNITED STATES PATENTS

| 2,916,690 | 12/1959 | Leete | 324—0.5 |
| 2,929,018 | 3/1960 | Varian | 324—0.5 |
| 2,996,657 | 8/1961 | Varian | 324—0.5 |
| 3,274,488 | 9/1966 | Washkurak | 324—0.5 |

RUDOLPH V. ROLINEC, *Primary Examiner.*

M. J. LYNCH, *Assistant Examiner.*